(No Model.) 2 Sheets—Sheet 1.

W. KRUTZSCH.
APPARATUS FOR EXTRACTING OIL FROM OLEAGINOUS SUBSTANCES.
No. 296,187. Patented Apr. 1, 1884.

Witnesses.
Robert Everett.
Chas. F. Hofer.

Inventor.
William Krutzsch.
By James L. Norris.
Atty.

(No Model.) 2 Sheets—Sheet 2.

W. KRUTZSCH.
APPARATUS FOR EXTRACTING OIL FROM OLEAGINOUS SUBSTANCES.
No. 296,187. Patented Apr. 1, 1884.

Witnesses.
Robert Burett
Chas. F. Ayer

Inventor.
William Krutzsch
By James L. Norris.
Atty.

UNITED STATES PATENT OFFICE.

WILLIAM KRUTZSCH, OF DAYTON, OHIO, ASSIGNOR TO THE BUCKEYE IRON AND BRASS WORKS, OF SAME PLACE.

APPARATUS FOR EXTRACTING OIL FROM OLEAGINOUS SUBSTANCES.

SPECIFICATION forming part of Letters Patent No. 296,187, dated April 1, 1884.

Application filed December 18, 1883. (No model.)

*To all whom it may concern:*

Be it known that I, WILLIAM KRUTZSCH, a citizen of the United States, residing at Dayton, in the county of Montgomery and State of Ohio, have invented new and useful Improvements in Apparatus for Extracting Oil from Oleaginous Substances, of which the following is a specification.

This invention relates to improvements in the apparatus for heating or cooking oleaginous seeds and other material preparatory to the extraction of the oil, for which Letters Patent No. 270,291 were issued January 9, 1883; but the improvements are also applicable to other forms of apparatus for extracting oil.

The objects of the present invention are to provide the heater with a bottom of novel construction, whereby the inflowing steam is compelled to traverse a tortuous course in the heater-bottom before it escapes, and to provide novel and efficient means for supporting the agitators and connecting them with their operating shaft. These objects I accomplish in the manner and by the means hereinafter described and claimed, reference being had to the accompanying drawings, in which—

Figure 1:
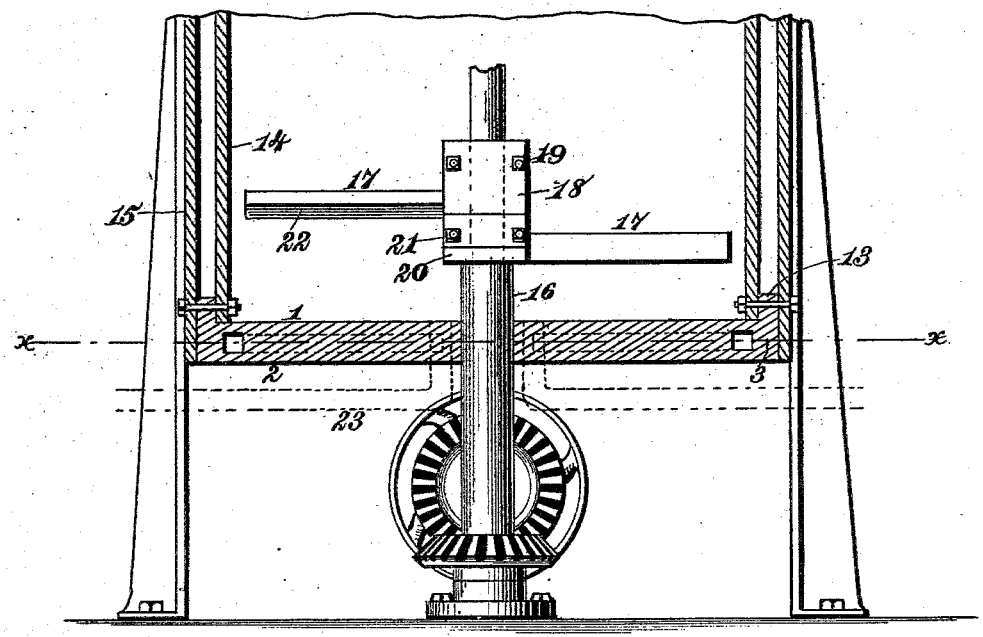
Figure 2:
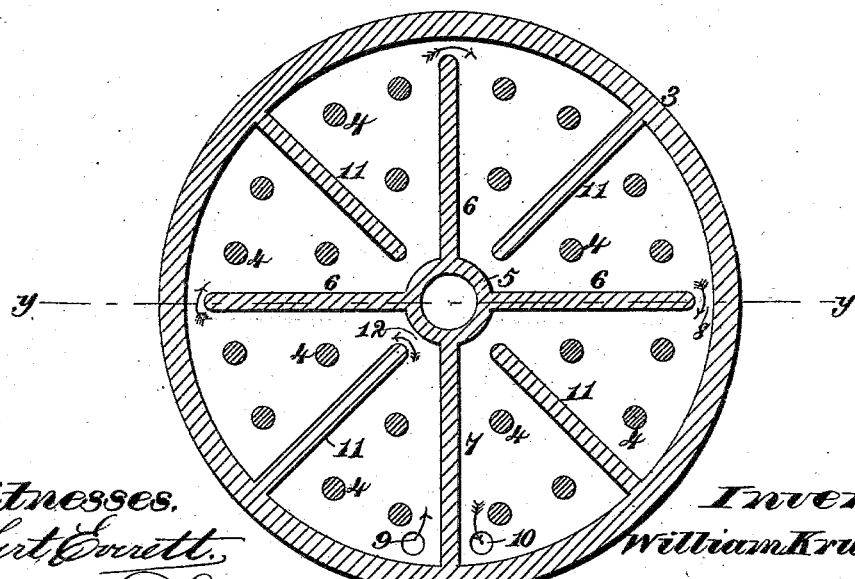
Figure 3:
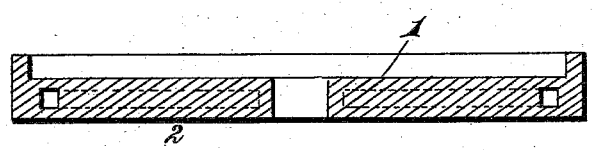
Figure 4:
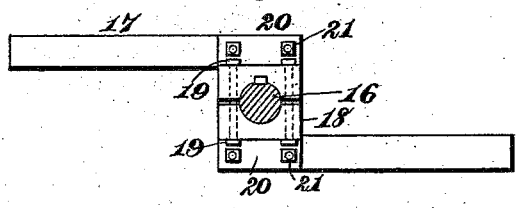
Figure 5:
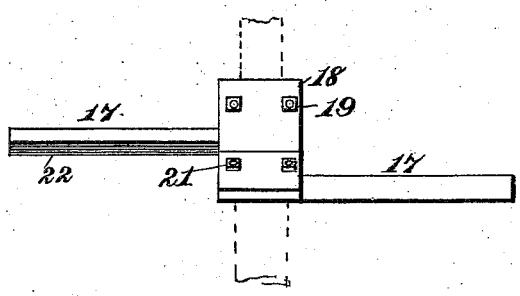
Figure 6:
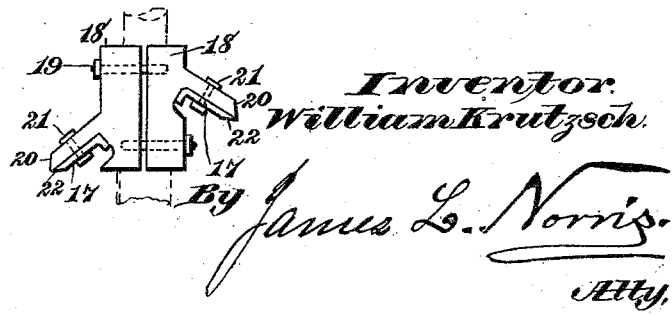

Figure 1 is a vertical central sectional view of sufficient of an apparatus for extracting oil to illustrate my invention; Fig. 2, a horizontal sectional view taken on the line $x\,x$ of Fig. 1; Fig. 3, a vertical sectional view taken on the line $y\,y$ of Fig. 2; Fig. 4, a plan view of the agitators and the devices connecting them with the shaft; Fig. 5, a side view of the same, and Fig. 6 an end view thereof.

The construction of the apparatus and its mode of operation are designed to be essentially the same as in the patent alluded to, except in the features hereinafter described and claimed.

Referring to the drawings, the number 1 indicates the bottom of the heater or kettle, which is made of a hollow casting to form upper and lower walls, 2, joined at their outer portions by a rib, 3, to create an intervening steam-space. The upper and lower walls are supported and strengthened by a series of short studs or posts, 4, disposed about the steam-chamber, and from the hub-bearing 5 radiate webs 6 and 7, the former terminating at a short distance from the rib 3 at the outer edges of the walls, to create steam-passages 8, while the web 7 extends entirely from the hub-bearing to said rib for separating or isolating the steam-inlet orifice 9 from the outlet-orifice 10. The heater-bottom is further provided with webs 11, which join its two walls and terminate adjacent to the hub-bearing to create the steam-passages 12. The outer edge of the top wall of the heater-bottom is annular, and provided with an annular vertically-projecting flange, 13, to the inner surface of which is firmly secured the lower edge of the sheet or other metal cylinder, 14, to form the kettle for receiving the oleaginous seed or other material, and to the outer surface of said flange is secured the lower edge of the wooden or paper cylinder 15, whereby an air-space is created between the two cylinders the exact width of the flange, the latter also serving to receive the bolts, screws, or other devices employed to attach the cylinders in position. The vertical shaft 16 for operating the agitators passes through the hub-bearing of the heater-bottom, and at a suitable elevation above the latter are arranged the horizontal agitators 17, which are supported and connected to the shaft in the following manner: The cast iron heads 18 are provided on their inner adjacent sides with longitudinal semicircular grooves adapted to receive and snugly fit upon the shaft with which they revolve through the medium of a key or keys, and screw-bolts 19, passing through the vertical side edges of one head, and entering screw-threaded orifices in the vertical side edges of the other head; but obviously ordinary bolts can be used for this purpose. These cast-iron heads are each formed with an inclined flange, 20, to the under sides of which are respectively secured the ends of the horizontally-arranged arms which compose the agitators 17, the means of attachment here shown consisting of bolts 21 passed through the flanges and agitators and secured by nuts. The faces of the flanges on which the agitators rest are inclined so that such agitators can be made of rectilinear form, and when attached in position will stand obliquely to the axis of the shaft and present a beveled longitudinal edge, 22, to the oleaginous material, so that in traveling around therein the agitators cause the material to ride upward upon their inclined faces, thus effectually and thoroughly displacing and stirring the mass, so that the whole is heated in the efficient manner required. The steam entering by a pipe, 23, through the inlet-orifice in the bottom wall of the heater-bottom is compelled to traverse the tortuous course indicated by the arrows, Fig. 2, before it escapes through the outlet-orifice, whereby the material in the kettle is heated and cooked very thoroughly preparatory to placing it in a press for the expression of its oil. The oleaginous material to be heated and cooked is introduced at the top of the kettle in any suitable manner—as, for instance, by a spout; but as the operation of this class of apparatus is well understood, I do not deem it essential to enter into a detailed explanation thereof further than to say that when the material is in the proper heated condition it is removed from the kettle and placed in press-boxes of a press for the expression of the oil.

Having thus described my invention, what I claim is—

1. In an apparatus for heating or cooking oleaginous substances for the extraction of oil, the kettle-heating bottom consisting of the upper and lower walls, and the radiating webs formed integral with the walls and creating steam-passages adjacent to the center of the bottom and its outer edge, the said bottom having a steam inlet and outlet arranged on opposite sides, respectively, of a web which extends from the hub-bearing to its outer edge, substantially as described.

2. In an apparatus for heating or cooking oleaginous substances for the extraction of oil, the kettle-heating bottom composed of a hollow casting comprising the upper and lower separated wheels creating the steam-space, the outer connecting-rib, the hub-bearing, the radiating webs terminating adjacent to the hub-bearing and the outer rib, and the web between the inlet and outlet extending continuously from the rib to the hub-bearing, substantially as described.

3. In an apparatus for heating or cooking oleaginous substances for the extraction of oil, the kettle-heating bottom consisting of the hollow casting forming the steam-chamber and provided with a surrounding vertical flange to which the kettle-cylinder and exterior cylinder are secured to create the intervening air-space of a width equal to that of the flange, substantially as described.

4. In an apparatus for heating or cooking oleaginous substances for the extraction of oil, the kettle-heating bottom composed of a casting comprising the separated walls, the hub-bearing, the outer connecting-rib, the radiating webs joining the walls and arranged to create steam-passages, and the flange rising from the outer edge of the upper wall to which the flange is secured, the inner and outer cylinders, substantially as described.

5. In an apparatus for heating or cooking oleaginous substances for the extraction of oil, the combination, with the heads secured to the shaft and having flanges, of the agitating-arms having one end secured to said flanges, substantially as described.

6. In an apparatus for heating or cooking oleaginous substances for the extraction of oil, the combination, with the vertical shaft, of the heads grooved to receive the shaft and having inclined flanges, and the agitating-arms secured to the flanges to stand oblique to the axis of the shaft, substantially as described.

7. In an apparatus for heating or cooking oleaginous substances for the extraction of oil, the combination, with the shaft, of the grooved heads clamped to the shaft by screw-bolts and provided with inclined flanges, and the agitating-arms having one end bolted to the flanges, substantially as described.

In testimony whereof I have hereunto set my hand in the presence of two subscribing witnesses.

WILLIAM KRUTZSCH.

Witnesses:
FREDERICK TSCHUDI,
JOHN L. H. FRANK.